United States Patent
Machura et al.

(10) Patent No.: US 8,156,764 B2
(45) Date of Patent: Apr. 17, 2012

(54) DEVICE FOR GRAVITY-BENDING GLASS ON SEVERAL SUPPORT MOULDS WITH CONTROLLED TRANSITION BETWEEN MOULDS

(75) Inventors: Christophe Machura, Chevincourt (FR); Serge Chiappetta, Machemont (FR)

(73) Assignee: Saint-Gobain Glass France, Courbevoie (FR)

( * ) Notice: Subject to any disclaimer, the term of this patent is extended or adjusted under 35 U.S.C. 154(b) by 690 days.

(21) Appl. No.: 12/097,785

(22) PCT Filed: Dec. 4, 2006

(86) PCT No.: PCT/FR2006/051277
§ 371 (c)(1), (2), (4) Date: Aug. 27, 2008

(87) PCT Pub. No.: WO2007/077371
PCT Pub. Date: Jul. 12, 2007

(65) Prior Publication Data
US 2009/0199595 A1     Aug. 13, 2009

(30) Foreign Application Priority Data
Dec. 20, 2005 (FR) ...................... 05 53969

(51) Int. Cl.
C03B 23/025 (2006.01)
C03B 23/023 (2006.01)

(52) U.S. Cl. ................ 65/290; 65/273; 65/287; 65/289; 65/291

(58) Field of Classification Search .................... 65/106, 65/107, 163
See application file for complete search history.

(56) References Cited

U.S. PATENT DOCUMENTS

| | | | |
|---|---|---|---|
| 5,167,689 A | | 12/1992 | Weber |
| 5,660,609 A | * | 8/1997 | Muller et al. ................... 65/107 |
| 6,076,373 A | * | 6/2000 | Grodziski ....................... 65/107 |
| 6,158,247 A | | 12/2000 | Didelot |
| 2003/0094017 A1 | | 5/2003 | Matsuo et al. |

FOREIGN PATENT DOCUMENTS

| | | |
|---|---|---|
| WO | 2004 103922 | 12/2004 |
| WO | 2005 033027 | 4/2005 |

* cited by examiner

*Primary Examiner* — Matthew Daniels
*Assistant Examiner* — Cynthia Szewczyk
(74) *Attorney, Agent, or Firm* — Oblon, Spivak, McClelland, Maier & Neustadt, L.L.P.

(57) ABSTRACT

A device for gravity bending of at least one glass sheet supported by at least one support forming part of a bending assembly, plural supports supporting the sheet during bending. The device includes a drive system for changing the shape of the support, the drive system controlling the rate of the change. A method of bending glass sheets utilizes the device.

7 Claims, 8 Drawing Sheets

DEVICE FOR GRAVITY-BENDING GLASS ON SEVERAL SUPPORT MOULDS WITH CONTROLLED TRANSITION BETWEEN MOULDS

BACKGROUND OF THE INVENTION

I. Field of the Invention

The invention relates to the gravity bending of glass sheets on a multiplicity of supports.

II. Description of Related Art

The gravity bending of glass sheets is well known. This bending may be carried out on a simple support, of the frame or skeleton type, the geometry of which does not vary during the bending. However, if it is desired to obtain particular, especially particularly pronounced, amounts of bending, it is useful to carry out the bending on supports whose geometry varies during bending. Thus, supports of the hinged skeleton type having two lateral parts that fold up during bending are known (see U.S. Pat. No. 4,286,980 or U.S. Pat. No. 5,167,689). Bending assemblies comprising two peripheral supports for the glass sheets in which one entirely substitutes for the other during bending are also known. Such assemblies have been described in EP 448 447 and EP 705 798. Finally, WO 2004/103922 teaches the successive use of two or three gravity bending supports. In general, on passing from one support to another, the concavity of the support increases, so that the concavity of the glass sheets progressively increases. These multiple supports are used in particular to prevent reverse bending (the opposite concavity to that desired) which may arise in the corners of the glazing.

BRIEF SUMMARY OF THE INVENTION

The change in shape of the support, such as for example on passing from one support to another, is a tricky step in so far as it is necessary for the glass not to jump or move laterally at the moment of the change in shape of the support. Now, this change in shape of the support may be relatively abrupt, sometimes resulting in a lateral displacement of the sheet and therefore a lower reproducibility of the final glazing, or even marking of the glazing. The present invention remedies this problem by allowing a gentle change in the shape of the support that is supporting the glass, especially a gentle transition from one support to another if the change in shape involves at least two supports. The glass therefore always remains in the correct position and the manufacturing batches are more uniform. Moreover, the risk of the glass being marked by the support(s) is reduced. The present invention applies to single-support devices, the shape of the support varying during bending, or to multi-support devices comprising two or three, or even more, supports. In addition, the device according to the invention may also combine substitution of at least two supports and variation in the shape of one of the supports.

The invention relates firstly to a device for the gravity bending of at least one glass sheet supported by at least one support forming part of a bending assembly, various shapes of support supporting said sheet during bending, said device comprising a drive system for changing the shape of the support, said drive system including a means of controlling the rate of said change.

The bending assembly is intended to be placed in a furnace, especially by passing through a furnace, so that the glass sheet or sheets to be bent reach the bending temperature (around 600° C.). According to one aspect, the furnace may form part of the device according to the invention.

The change in shape occurs after an intermediate degree of bending has been obtained. The new shape is then used to increase the bending.

The change in shape of the support is controlled by a drive system comprising a movement generator system and a transmission member (which can pass through one wall of the furnace) in order to transmit said movement to the bending assembly and to control the shape change. The rate of change in shape of the support is regulated by regulating the speed of movement generated by the movement generator system, which may be placed outside the furnace.

Placing the movement generator system outside the furnace is advantageous if it comprises electromechanical members unable to withstand the bending temperatures. This movement is transferred to the bending assembly via a transmission member. If the movement generator system is placed outside the furnace, the transmission member passes through one of the walls of the furnace (encompassing the side walls but also the floor and the roof).

The change in shape may relate only to a single support, especially when it is of the hinged skeleton type, such as for example that described in U.S. Pat. No. 4,286,980. The shape change may also consist of a partial support substitution (as in U.S. Pat. No. 5,167,689) or a complete support substitution (as in EP 705 798).

The shape change may be effected by lowering or raising a support.

The invention relates especially to a device for the gravity bending of at least one glass sheet on several supports, comprising a bending assembly comprising a first support and a second support, said device also including a drive system for substituting the first support with the second support, the drive control system including a means of controlling the rate of substitution.

The term "first support" refers to the support that supports the glass before the second support. Even though in this embodiment the invention is most particularly described with two supports, the bending assembly may also comprise at least one other support, coming before the first support or after the second support.

In general, the second support has, at all points, a more pronounced concavity than the first support. This is because it is used, after a certain amount of bending has been achieved, to increase the bending.

Within the context of the invention, any support for the glass, such as here the first and second support, forms part of a bending assembly. This bending assembly may be made to run through a furnace, especially of the tunnel type, so as to raise the glass to its gravity bending temperature. When the glass has reached its bending temperature, it starts to curve under its own weight. After a first degree of intermediate bending has been obtained, the change in shape of the support (such as the transition from the first support to the second support) is initiated by the drive system, and the glass continues to be bent on the modified support (which may be the second support). The bending stops when the glass has undergone a final degree of bending, by cooling it. The drive system may be partly outside the furnace. In general, the drive system comprises a generator system (or motor) and a transmission member for linking it to the bending assembly. The generator system generates the base movement intended to initiate the shape change, such as a support substitution. The transmission member transmits this base movement coming from the generator system to the bending assembly so as to initiate and control the change. In general, the generator system may be outside the furnace, this being preferable if it comprises electromechanical means, owing to the high temperatures inside the furnace (around 600° C.). In this case, the transmission member passes through one wall of the furnace so as to be able to transmit the initiation command from the generator system located outside the furnace to the bending assembly located inside the furnace. The term "wall" should be understood in its most general sense—it may be one of the vertical walls of the furnace, or the floor or the roof.

The movement generator system may be outside the bending assembly. In particular, this generator system may even be partly outside the furnace in which the assembly is located. In particular, the transmission member may initiate the transition coming from the roof (or ceiling) of the furnace, or from the floor of the furnace, or from at least one of the sides of the furnace. The bending assembly may be of the carriage type so as to move through a tunnel furnace. The carriage may have wheels, which allow the carriage to run along rails laid on the floor of the furnace. In a tunnel furnace, the rails are parallel to the axis of the furnace.

To give an example, the means of controlling the rate of shape change (such as the substitution of one support with another) may comprise the combination of a horizontal bar linked to one of the supports, of a part with an inclined surface and of a means of moving said part with an inclined surface horizontally, it being possible for the inclined surface to support said horizontal bar so that the horizontal movement of the part with an inclined surface is reflected in a vertical movement of the support linked to the horizontal bar. Thus, the horizontal bar linked to one of the supports slides on the inclined surface and moves vertically as a direct consequence of the inclination of said surface. The support or support part linked to the bar can therefore be raised or lowered by a simple horizontal displacement of the part with an inclined surface. By controlling the rate of horizontal displacement of the part with an inclined surface, the speed of vertical displacement of the support bearing the horizontal bar is controlled.

Thus, the invention also relates to a device in which the change in shape is effected by the vertical displacement of a support or support part, a horizontal bar being linked to said support or to said support part to be moved, an inclined surface being linked to a member for transmitting the movement from the movement generator system and moving horizontally in order to push or retain, by sliding, said horizontal bar vertically.

The drive system may substitute, facing the glass, a first support with a second support during bending. This substitution is generally carried out by a vertical relative displacement of the supports between one another. In general, it is sufficient to move only one of the supports vertically, either by lowering the first support (the second remaining stationary), or by raising the second support (the first remaining stationary). During this operation, the glass passes from the first support to the second support.

Within the context of the present invention, the glass sheet and the support(s) are in general approximately horizontal.

Generally, each support forms a complete perimeter for supporting the entire periphery of the glass sheet. Such a support may be termed a peripheral continuous support. However, it is not excluded for one of the supports to be merely one or several segments supporting only a portion of the periphery of the glass sheet. Such a support may be termed a peripheral discontinuous support.

Seen from above and in the case in which the bending assembly comprises two supports, one of the supports lies generally inside the other. The first support may, seen from above, lie inside the second support. The second support may, seen from above, lie inside the first support.

In one particularly suitable embodiment, the relative vertical movement of the two supports is provided by lowering the first support, the second remaining stationary, at a constant height, throughout the bending. The force causing the lowering may preferably be quite simply the force of gravity. In this case, the first support is initially locked in the high position during the first bending phase and is unlocked at the opportune moment for freeing the first support and allowing the force of gravity to pull it downward. A means of controlling and slowing down the drop of the first support softens the transition from the first to the second support. This slowing-down means may be the combination of a horizontal bar fastened to the first support and of a part with the inclined surface passing beneath the bar, coming into contact with it and moving horizontally. The part with the inclined surface, via its contact with the horizontal bar linked to the first support, moderates and contains this force of gravity in order to ensure that the first support is lowered in a controlled and progressive manner.

A bending assembly according to the invention may comprise at least two identical systems for initiating and controlling the shape change (especially a support substitution) which are mounted on the assembly symmetrically with respect to the direction of displacement of the assembly and acting simultaneously on either side of the assembly.

Thus, the invention also relates to a device according to comprising several movement generator systems for transmitting the movement at several different points in the bending assembly.

Within the context of the invention, each support that has to move vertically is generally linked to a means for locking this moveable support laterally so that this support can move only vertically but not horizontally. This lateral locking means may be of the cross-brace type.

Instead of letting the first support drop, while still controlling its fall in order to soften it, the reverse procedure may be carried out. In this case, the first support is stationary and it is the second support that is raised. This raising of the support may be accomplished using a horizontal bar fastened to the second support and sliding upward over an inclined surface. This sliding may be controlled from outside the furnace. Inclined surfaces are directed toward the center of the bending element, come into contact with these bars and then raise them by sliding during their horizontal progression.

Within the context of the invention, any bending support is generally of the frame or skeleton type. These supports may be covered with refractory woven or knitted fabrics (made of metal and/or ceramic fibers) well known to those skilled in the art for further reducing the risk of marking the glass by said supports.

The assembly according to the invention allows a glass sheet or several (especially two) superposed glass sheets, generally separated from each other by a powder well known to those skilled in the art for preventing them from sticking, to be bent. In particular, several glass sheets are bent simultaneously when it is desired thereafter to assembly them as laminated glazing. Simultaneous bending confers better identity of the bending of the various sheets that have to be joined together in the same glazing.

In one particularly suitable embodiment, the relative vertical movement of the two supports is provided by lowering the first support, the second remaining stationary at a constant height throughout the bending. The force causing the lowering may preferably be quite simply the force of gravity.

However, the reverse operation may be carried out, by raising the second support and leaving the first one at a fixed height. The combination of lowering one support and raising the other is possible.

The transmission member may pass horizontally through at least one side wall of the furnace. However, in this way the travel (or progression) of said member may be impeded by elements inside the bending assembly. If it is desired to have particularly large travels, it may be preferable to transmit the movement vertically through the floor of the furnace. This is especially preferable when it is desired to raise in this way a highly curved skeleton or the hinged (generally lateral) parts of skeletons (such as the element 91 in FIG. 9, described below). Thus, it is possible to achieve progressions of up to 650 mm for example.

Thus, the invention also relates to a device, a support of which varies in shape during bending. This support may be of the hinged skeleton type. Generally, changing the shape then consists in raising two lateral parts of the bending support. According to the invention, this change is achieved in a controlled manner. It is possible to effect this change by a system similar to those already described above, by combining an inclined surface and a horizontal bar. In this case, a horizontal bar is linked to a lateral part to be raised. The horizontal surface moves horizontally, comes in contact with this bar and raises it, continuing its progression toward the center of the bending assembly. This shape change may also be effected by transmitting a vertical movement, especially through the floor of the furnace. In this case, the part to be raised is provided with a stop and a rod that presses this stop upward, thus raising that part of the support to be raised.

This support having a shape that varies over the course of the bending may form part of a bending assembly comprising at least two supports. In particular, this support varying in shape during bending may be the second support, said variation in shape being controlled by a second drive system (the first controlling the substitution of the first support with the second) comprising a means of controlling the rate of said variation and a movement generator system placed outside the furnace and a transmission member passing through the floor of the furnace in order to transmit said movement. In particular, the variation in shape of the second support is generally initiated after the substitution of the first support with the second has taken place.

The invention also relates to the method of gravity bending at least one glass sheet on several supports by the device according to the invention. The method is particularly suitable for simultaneously bending several, especially two, superposed glass sheets. The invention is particularly suitable for producing bent automotive glass, especially laminated windshields comprising several glass sheets separated by a polymer of the polyvinyl butyral type. Thus, the various sheets that have to be joined together as laminated glazing may be bent simultaneously, by placing them juxtaposed on the bending assembly according to the invention.

Thanks to the invention, any change in shape of a support may be accomplished progressively and gently, especially over at least 3 seconds, or at least 4 seconds or at least 5 seconds or at least 6 seconds or even longer.

BRIEF DESCRIPTION OF THE DRAWINGS

In the drawings, wherein like reference numerals refer to similar components.

DETAILED DESCRIPTION OF THE INVENTION

Figure 1:
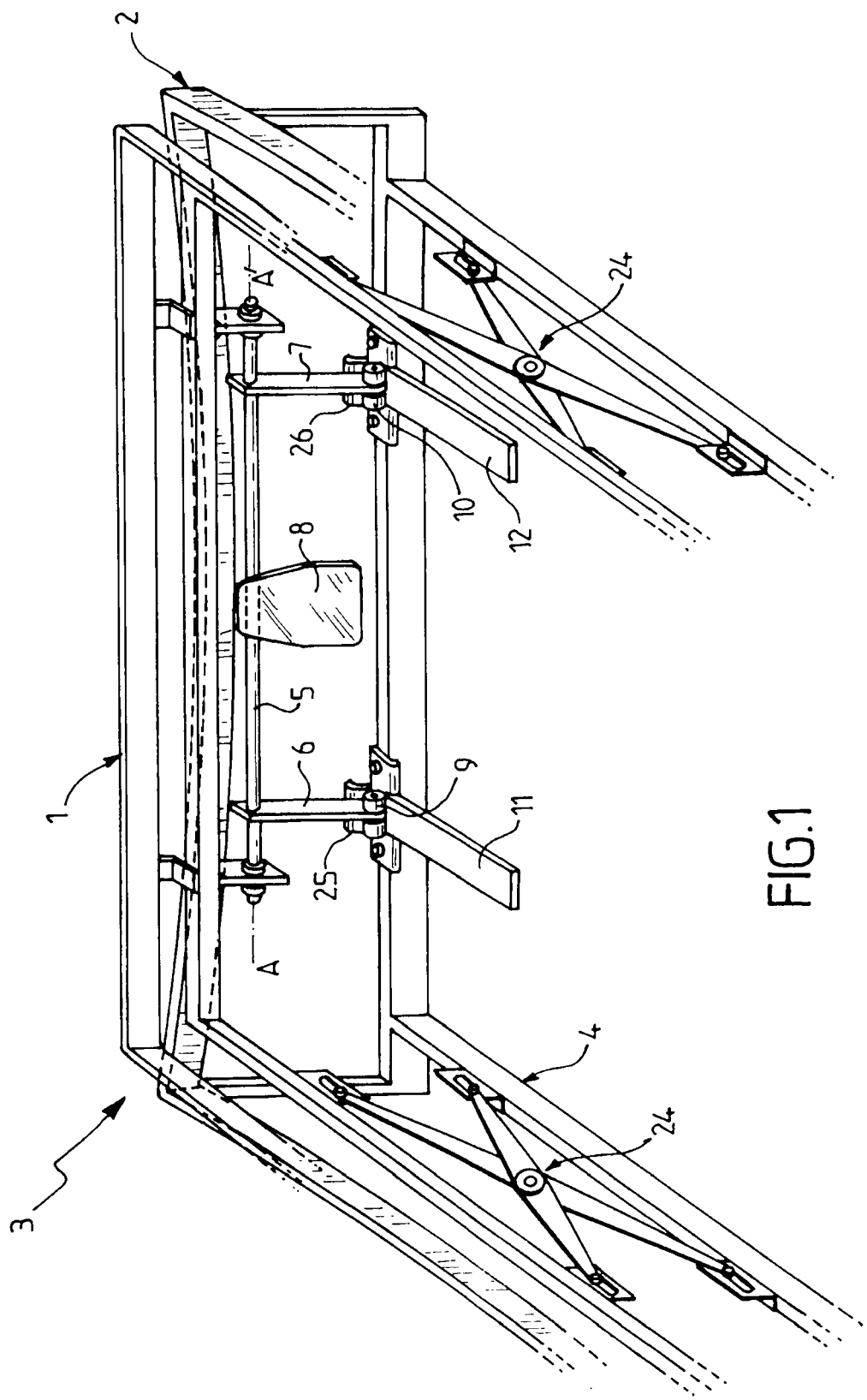
FIG. 1 shows a partial perspective view of a bending assembly.

FIG. 1 shows a bending assembly 3 comprising a first support 1 and a second support 2. This assembly is shown in the state corresponding to the first bending phase, that is to say the first support is in an upper position for carrying the glass sheet placed horizontally thereon. The second support 2 is in a lower, standby, position. This second support is fastened to the framework supporting the assembly and does not move throughout the bending operation. This figure shows part of the system for initiating the replacement of the first support with the second support in the upper position for supporting the glass. This part of the system is fixedly linked to the first support and comprises a horizontal bar 5 (a different bar from that used to control the rate of lowering of the first support) which can rotate about its axis AA', a pad 8 fastened to this bar 5 being able to receive a thrust via the outside of the assembly (and therefore via the concealed side of the pad shown in FIG. 1) causing the bar 5 to rotate about its axis AA', and vertical rods 6 and 7 fastened to the bar 5 on each side of the pad, these rods terminating at their lower ends in castors. Tracks 11 and 12 are fixedly joined to the framework 4 and pass beneath the castors 9 and 10. In FIG. 1, the support 1 is in the high position owing to the fact that the castors 9 and 10 are in the raised position so that the rods 6 and 7 are vertical and keep the bar 5 in the high position and the pad 8 in the vertical position. Behind the castors, stops 25 and 26 prevent the castors from moving toward the outside of the bending assembly. A folding cross-brace system 24 ensures lateral locking of the support 1 without impeding its vertical movement. This cross-brace system is fastened on one side to the framework 4 and on the other side to the first support 1. It ensures that the first support keeps the same lateral position irrespective of its height. Another equivalent cross-brace system lies opposite, mounted symmetrically on the bending assembly.

Figure 2:
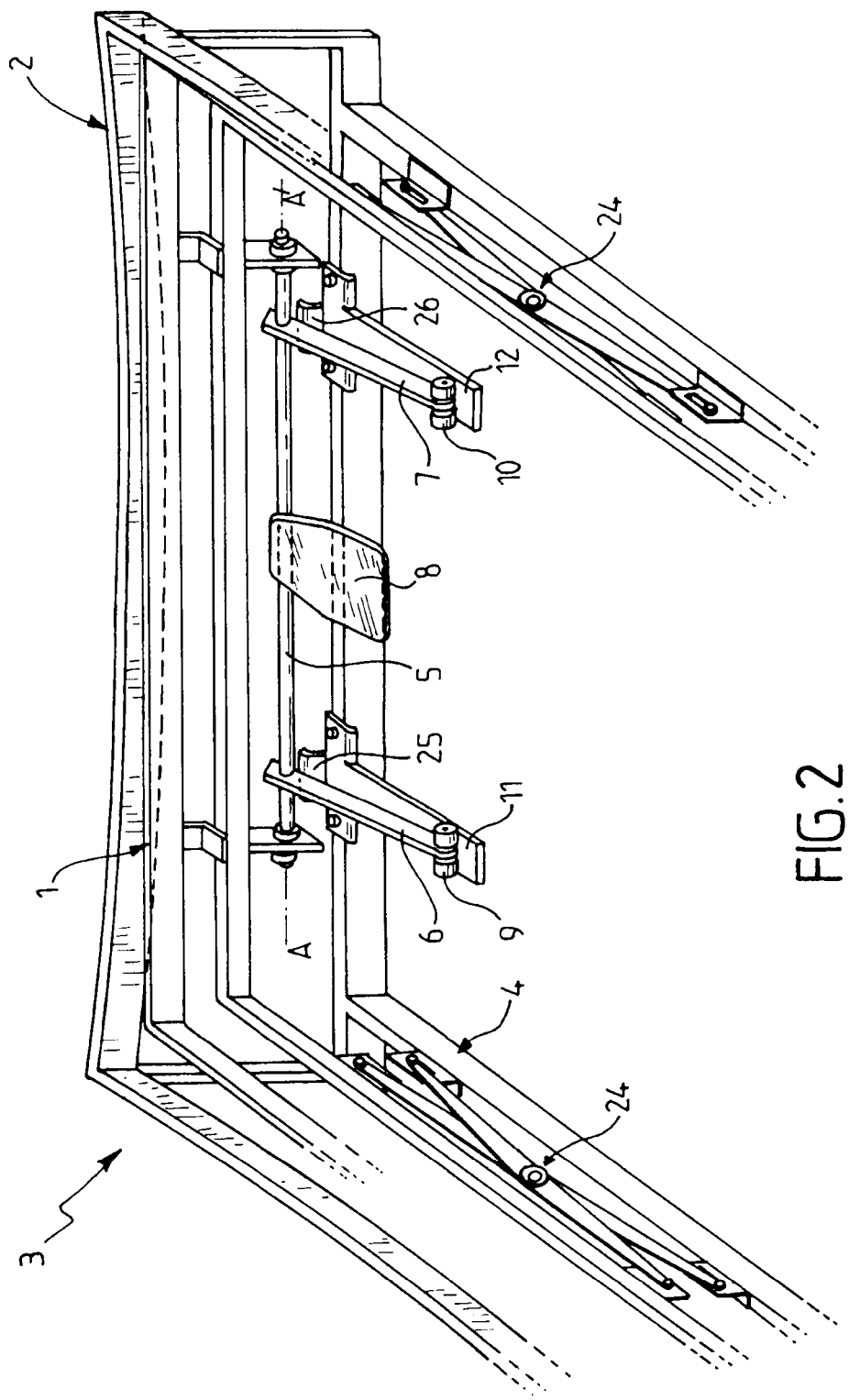
FIG. 2 shows a partial perspective view of the bending assembly of FIG. 1 after substitution of supports.
Figure 10:
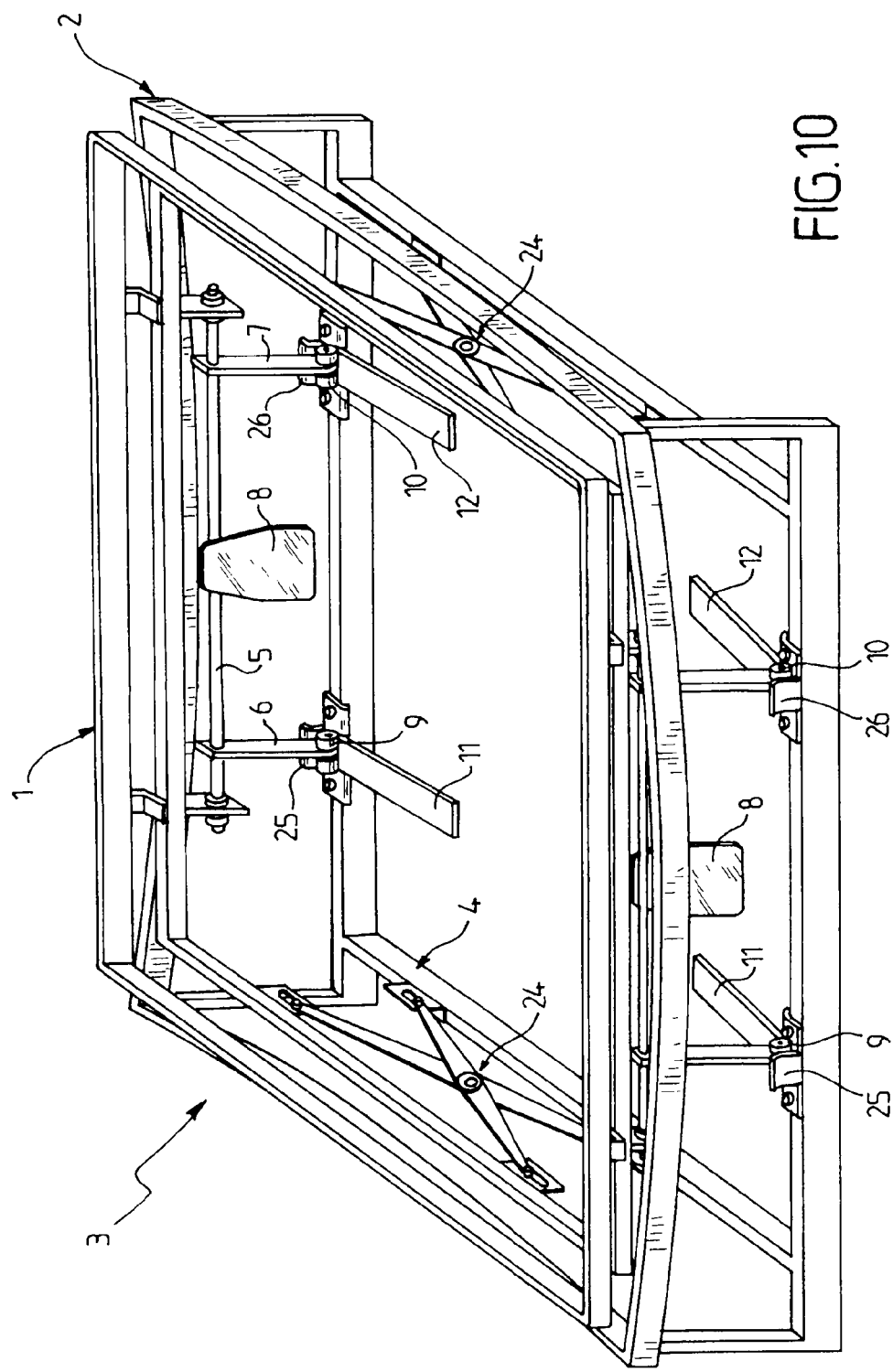
FIG. 10 shows a perspective view of the bending assembly of FIG. 1.

FIG. 2 shows the same assembly as in FIG. 1, but after the substitution of the first support 1 with the second support 2 has been initiated. Consequently, the support 2 lies in the upper position suitable for supporting the glass. In fact this support 2 remains stationary while the support 1 is being lowered. The substitution is initiated by a horizontal thrust on the pad 8 on the opposite side from that visible in FIGS. 1 and 2. This thrust rotates the bar 5 about its axis AA', rotates the rods 6 and 7 about the same axis and makes the castors 9 and 10 run along the tracks 11 and 12. As a consequence of this movement and because the rods 6 and 7 are no longer in the vertical locking position, the support 1 drops, under the effect of gravity, down to a level below that of the support 2. The cross-brace system 24 is folded because the support 1 is in the low position. For the sake of clarity of FIGS. 1 and 2, only part of the mechanism of the bending assembly has been shown. In general, each assembly comprises two identical mechanisms mounted facing each other in the assembly, as shown in FIG. 10.

Figure 3:
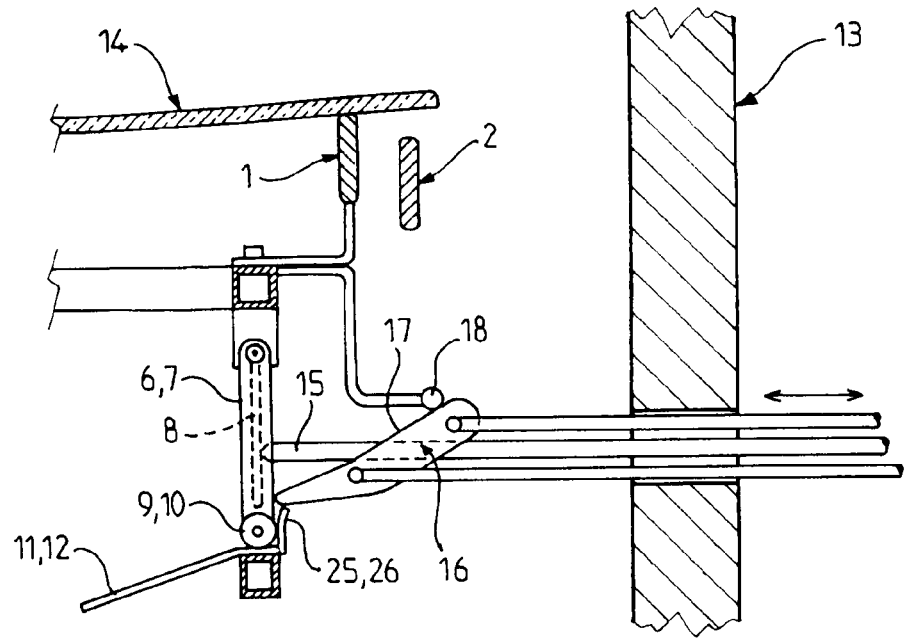
FIG. 3 shows a cross-sectional view of the bending assembly of FIG. 1.

FIG. 3 shows part of the assembly in a view parallel to the axis AA'. The assembly is in a position identical to that shown in FIG. 1, that is to say the first support 1 is in the high position and the second support 2 is in the standby position, the rods 6 and 7 and the pad 8 (shown dotted as it is concealed by a rod) are in the vertical position, and the castors 9 and 10 are at the start of the tracks 11 and 12. Since this is the initial phase of the bending, the glass sheet 14 has undergone little or no bending. The bending assembly is in a bending furnace, one partition 13 of which, made of a refractory material, has been shown. Openings have been made through this partition so that drive elements for initiating and controlling the substitution of the supports can pass through it. These drive elements comprise a pusher capable of thrusting against the pad 8, which initiates the lowering of the first support. In the absence of elements for controlling the rate of descent of the first support, the transition from the first support to the second support would be abrupt. The drop of the first support is braked by the presence of the part 16, which has an inclined surface 17. Just before the pad 8 is pushed by the pusher 15, the top of the inclined surface is positioned beneath a receiving tube 18 fixedly linked to the first support. When the pusher has pushed the pad 8, so as to start the descent of the support 1, the tube 18 comes into contact with the top of the inclined surface of the part 16. When the part 16 is pulled back through the partition 13 toward the outside of the bending furnace, the tube 18 rolls or slides over this surface downward, until the support 1 has been completely lowered. It will be understood that the speed at which the part 16 is pulled back toward the outside of the furnace has a direct consequence on the rate of substitution of the first support with the second.

Figure 4:
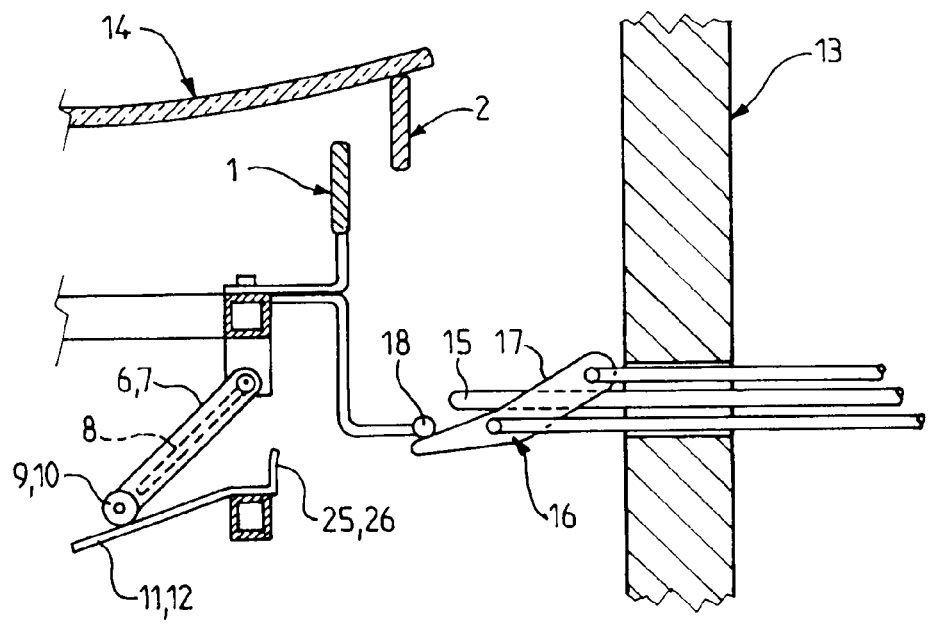
FIG. 4 shows a cross-sectional view of the bending assembly of FIG. 1 after substitution of supports has been initiated.

FIG. 4 shows the same elements as in FIG. 3, but after the substitution of the supports has been initiated. The tube 18 is lowered (by rotation or sliding) over the inclined surface 17 and the support 1 has been substituted with the support 2 for supporting the glass sheet 14, which appears more curved than in FIG. 3 as it is in a more advanced phase of the bending operation.

Figure 5:
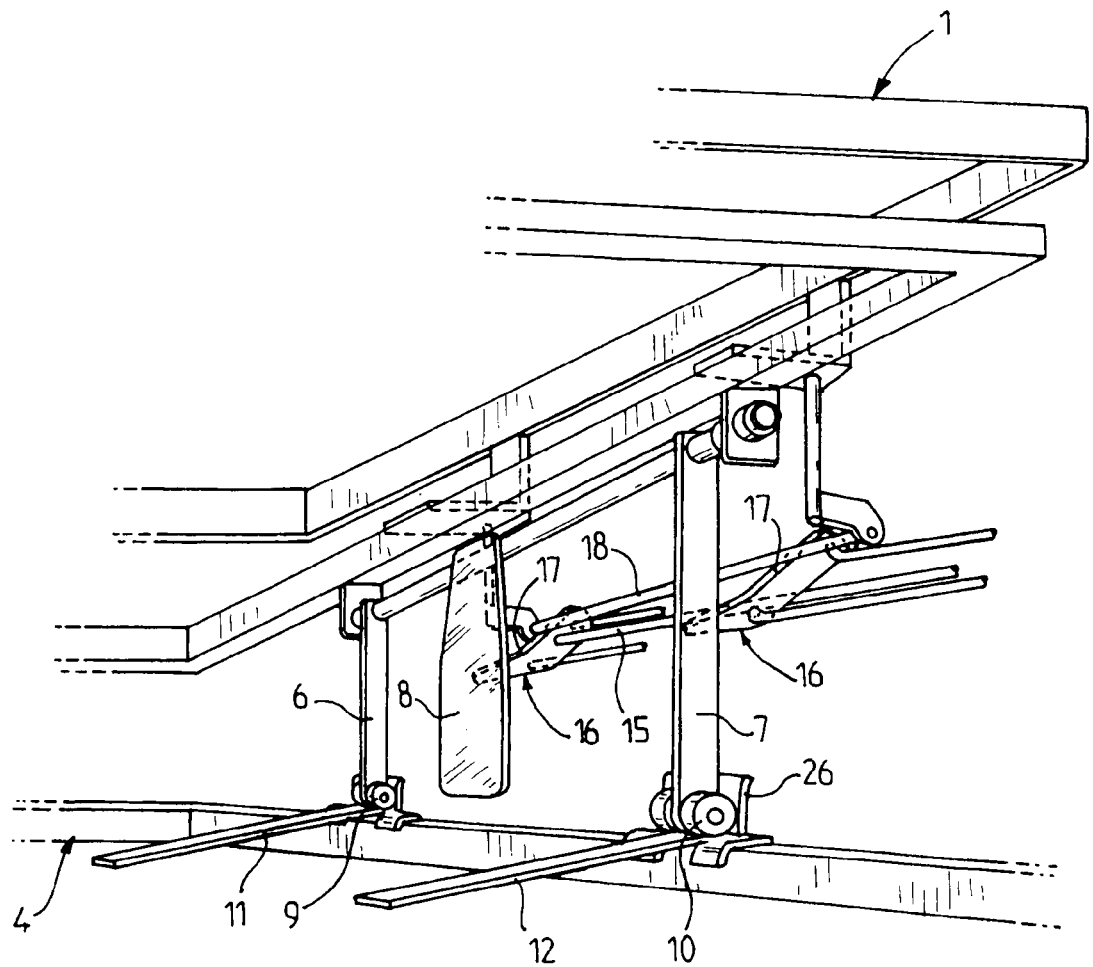
FIG. 5 shows a perspective view of a system for initiating and controlling substitution of the supports.

FIG. 5 shows, in perspective, the system for initiating and controlling the substitution. The same elements as in the previous figures may be recognized, these bearing the same reference numbers (the second support 2 has not been shown in order to make the representation of the mechanism clearer). To the rear it may be seen that the part 16 may be a pair of two parts, each having an inclined surface 17. The substitution of the supports has not yet been initiated and the pad 8 is vertical. The elements 15 and 16 for initiating and controlling the substitution of the supports are close by to the rear.

It may be clearly seen from FIGS. 3 and 4 that the system may be easily reversed in so far as it is possible to choose to substitute one support with another by raising one of the supports instead of lowering one of them. Thus, a bending process could for example start in the configuration shown in FIG. 4, the support 1 being lowered and therefore becoming the "second support" within the context of the invention. The glass has therefore undergone little or no bending. The bending process is continued and the inclined surface 16 comes into contact with the bar 18 and raises it for continuing its ingress toward the inside of the furnace. When the support 1 has been raised, it supports the glass, which is bent more, and the castor (9, 10) comes into its housing at the top of the track (11, 12) in order to lock the support 1 in the high position. In this mode of operation, the pusher 15 is unnecessary.

Figure 6:
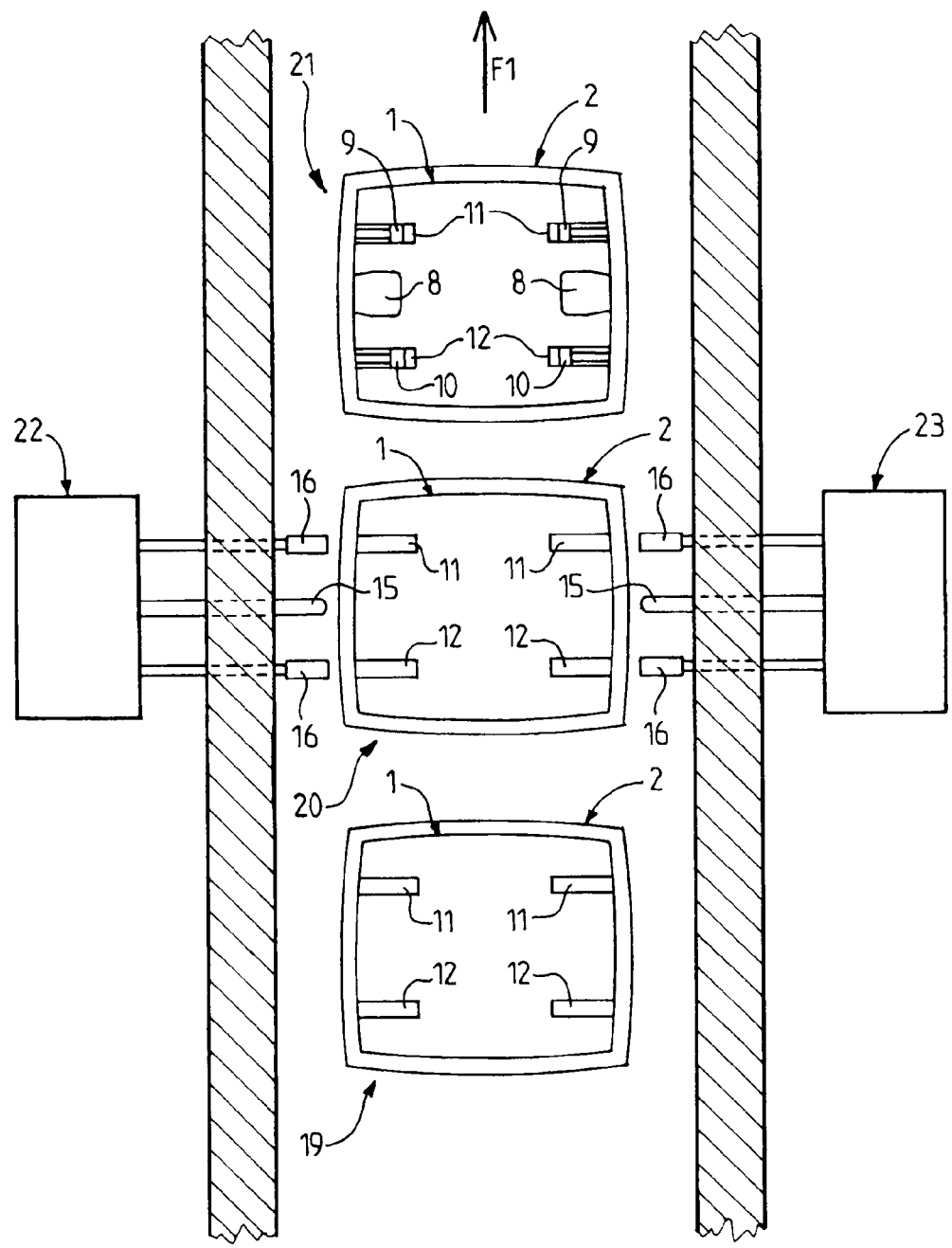
FIG. 6 shows a top view of the inside of a bending tunnel furnace in which bending assemblies move.

FIG. 6 shows, seen from above, the inside of a bending tunnel furnace within which the bending assemblies move. These bending assemblies can be moved by any well-known electromechanical means in the direction of the arrow F1. They may for example be mounted on castors and run along rails, said assemblies being attached one behind another in the manner of a train. The bending assemblies have been shown very schematically with a minimum of elements for the sake of clarity. In particular, the glass sheets have not been shown. Each bending assembly 19, 20, 21 comprises a first support 1 and a second support 2. Also shown are the tracks 11 and 12 on which the castors 9 and 10 can run so as to lower the first support 1.

As the bending assemblies travel through the tunnel furnace, they arrive in a zone between two drive stations 22 and 23 for initiating the shape change. These stations act symmetrically on each side of the tunnel furnace. In fact, these stations are coordinated so as to act simultaneously and they may be considered to form in fact a single drive station. Each station comprises a movement generator system. The transmission member that communicates the movement from each station passes through the walls of the furnace so as to interact with the bending assembly when the latter is in the correct position. Each drive station comprises, as transmission member, a pusher 15 and a pair of parts 16 with an inclined surface.

The bending assembly 19 has not yet passed into the initiation zone and its castors 9 and 10 (not shown) are above the tracks 11 and 12, in the locked position so that its first support is in the upper position.

The bending assembly 20 is in the initiation zone before the initiation, and the elements 15 (pusher) and 16 (parts with an inclined surface) for initiating and controlling the substitution of the supports are close by. The stations 22 and 23 control the rate of ingress and withdrawal of these initiation/control elements. The rate of substitution of the first support 1 with a second support 2 is controlled by controlling the speed of movement generated by the movement generator system included in each drive station 22 and 23.

The bending assembly 21 has already undergone the support substitution operation. The second support is therefore in the upper position. The castors 9 and 10 are at the bottom of the tracks 11 and 12, and the two pads 8 have been pushed toward the inside of the bending assembly.

Figure 7:
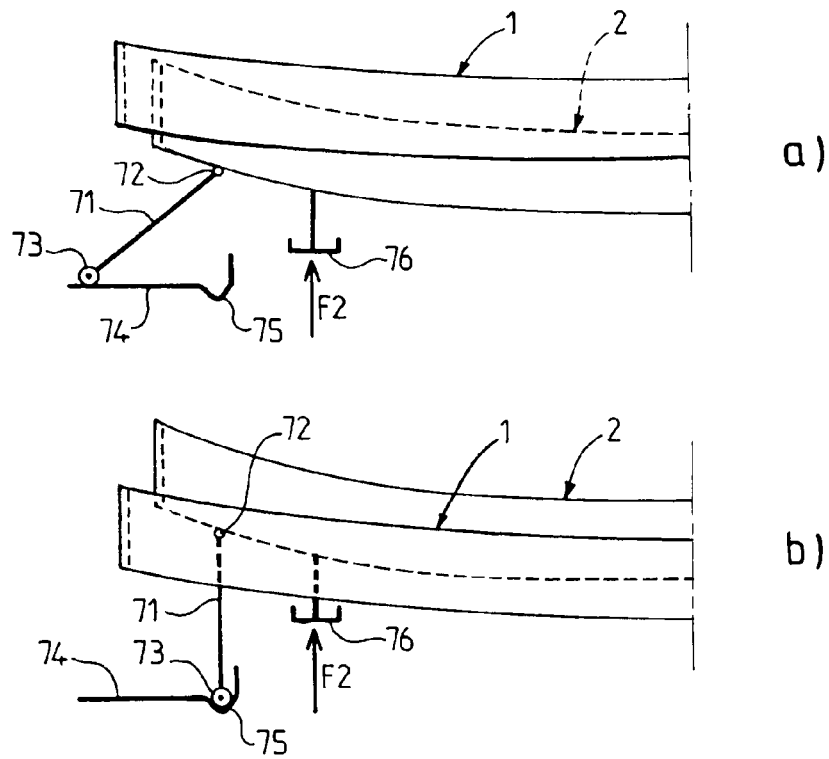
FIG. 7 shows a schematic side view of a support transitioning device.

FIG. 7 shows schematically, in side view, a device according to the invention in which the transition from one support to the other is controlled from underneath, and in which the second support is raised during the transition. The first support here is fixed relative to the framework of the bending assembly. The bending assembly comprises a first support 1 and a second support 2. A stop 76 is fastened to the second support, said stop being capable of receiving a thrust from below, represented by the arrow F2. A metal rod (not shown) acts along this direction so as to push the stop 76. This rod passes through the floor of the furnace and is actuated beneath and outside the furnace. In this embodiment, the metal rod transmits both the initiation of the transition and the control of the rate of transition. This is because, by controlling the rate of rise of the metal rod from outside the furnace by any suitable electromechanical means, the rate of transition from the first support to the second support is controlled. The second support may be locked in the high position. What happens is that a rod 71, fastened to the second support while still being able to rotate about a horizontal axis 72, becomes upright as the second support 2 is raised. Its end is provided with castors 73 that run along the track 74. This track is fixed with respect to the framework of the bending assembly. When the second support is in its raised final position, the rod 71 is vertical and the castor 73 is engaged in the locking groove 75. Thus, the metal rod that has pushed the stop 76 along the direction of the arrow F2 can then be lowered without this being accompanied by a descent of the second support, which remains locked in the high position.

Figure 8:
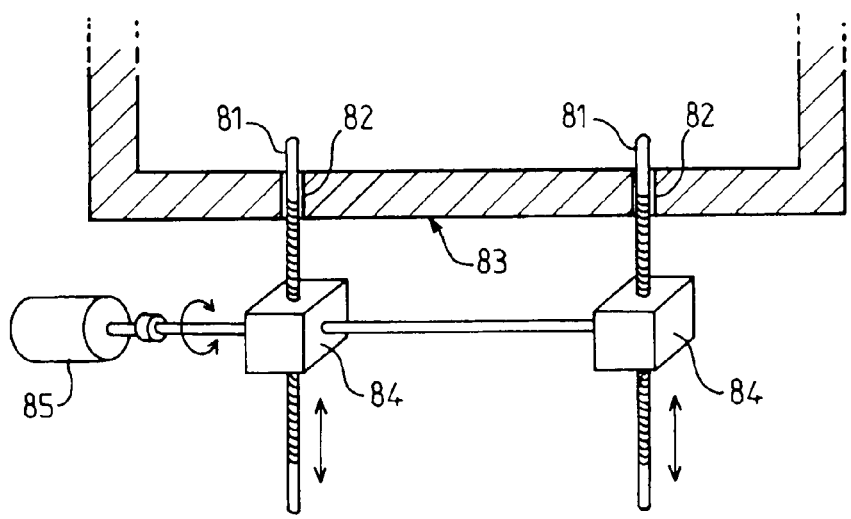
FIG. 8 shows a perspective view of a device for generating vertical thrust.

FIG. 8 shows a device suitable for generating the vertical thrust along the direction of the arrow F2 shown in FIG. 7. The rods 81 can move vertically so as to exert this thrust. They penetrate the floor 83, passing through openings 82. Their vertical movement is controlled by a motor 85 to which they are linked via screw jacks 84. These rods may be raised or lowered by controlling the direction of rotation of the motor and at a greater or lesser rate by controlling the speed of rotation of the motor. In general, at least two rods, and even four rods, actuate a movement in the bending assembly.

Figure 9:
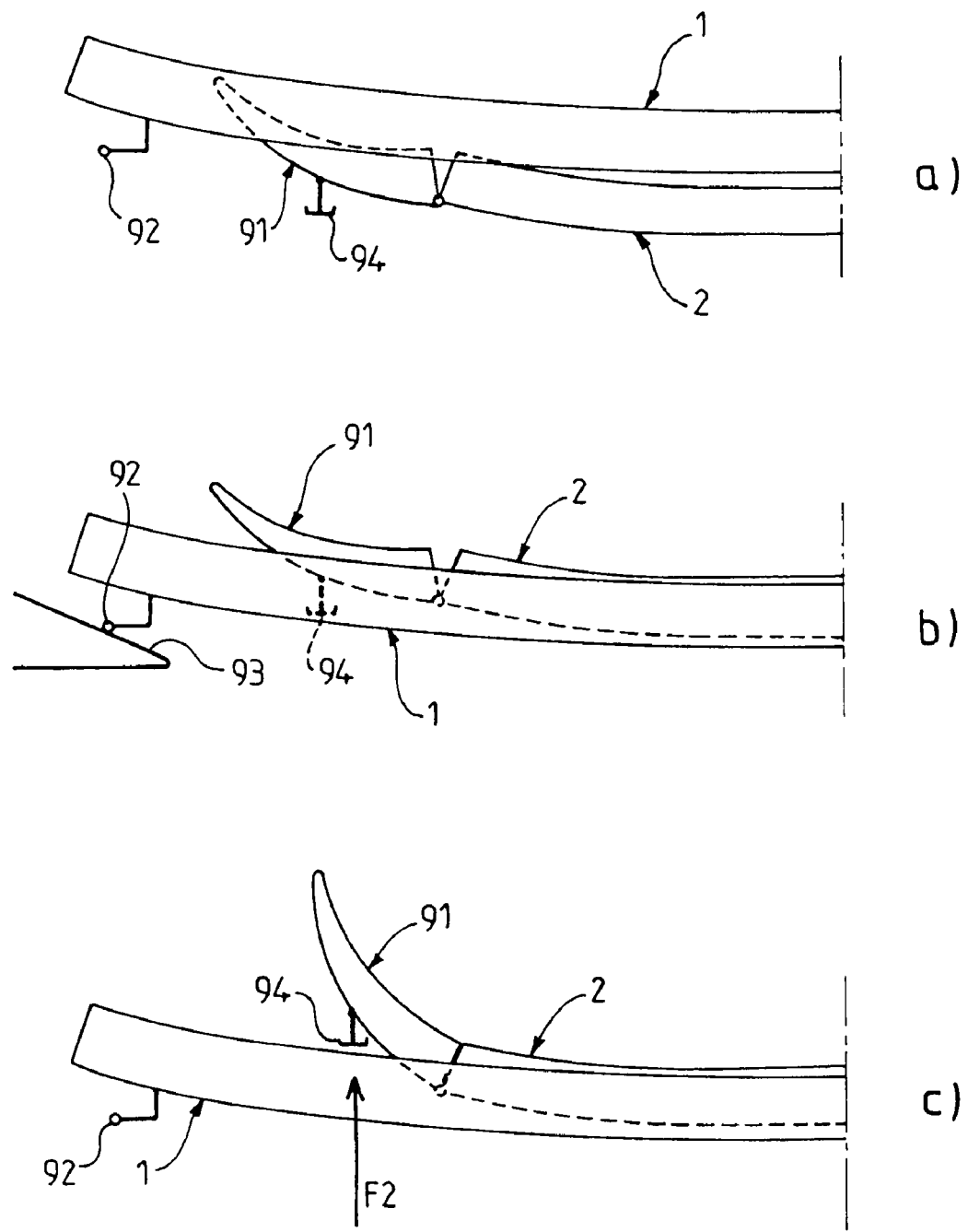
FIG. 9 shows a schematic side view of a device combining two types of movement.

FIG. 9 shows a device that combines two types of movement, one being controlled from the sides of the furnace, the other being controlled from below the furnace. The bending assembly here comprises a first support 1 and a second support 2 of the hinged type, that is to say that this second support comprises two lateral portions 91 that may be raised during the bending process. The glass undergoes the bending process shown in FIG. 9, namely firstly FIG. 9*a*), then FIG. 9*b*) and then 9*c*). At the start, the glass (not shown) rests horizontally on the first support 1. After a first bending on this first support, the controlled descent of this first support is caused by a bar 92 sliding over an inclined surface 93 (in the model of the mechanism illustrated in FIGS. 3 and 4), and the glass is then supported by the second support, the lateral portions 91 of which have not yet been raised at this stage. After a certain amount of bending in this configuration, the lateral portions 91 are raised by pushing from below against the stop 94 in the direction of the arrow F2 on the principle of the mechanism shown in FIG. 8. The glass then assumes its definitive shape, with two more particularly bent lateral edges.

FIG. 10 shows the complete bending assembly of FIGS. 1 and 2, in the position as in FIG. 1. It may be seen that two systems for initiating and controlling the support transition face each other, each system having to be actuated on its side on the principle of FIG. 6. Each system comprises its pad 8 and its tracks 11 and 12. These two mechanisms are actuated simultaneously for making the transition from the support 1 to the support 2.

The invention claimed is:

1. A device for gravity bending of at least one glass sheet, the device comprising:
   a bending assembly including a plurality of supports to support the at least one glass sheet during bending;
   a furnace; and
   a drive system that changes a position of at least one of the supports, the drive system including:
      a displacement-controlling device that controls the rate of change of the position of the at least one of the supports,
      a movement generator-regulating system that generates and regulates the speed of a movement, the movement generator-regulating system being placed outside the furnace, and
      a transmission member connected to the movement generator-regulating system to transmit the regulated movement to the displacement-controlling device, the transmission member passes through a wall of the furnace to transmit the movement to the bending assembly and control the change of the position of the at least one of the supports via the displacement-controlling device.

2. The device as claimed in claim 1, wherein the rate of change of the position of the at least one of the supports is controlled by the speed of the movement generated and regulated by the movement generator-regulating system placed outside the furnace and transmitted to the displacement-controlling device via the transmission member.

3. The device as claimed in claim 1, wherein the drive system further comprises a plurality of movement generator-regulating systems connected to a plurality of transmission members, respectively, to transmit movement at a plurality of different points in the bending assembly.

4. The device as claimed in claim 1, wherein the bending assembly includes a vertically-displaceable support or support part, and a horizontal bar being linked to the vertically-displaceable support or to the support part, an inclined surface being linked to the transmission member that transmits the movement from the movement generator-regulating system and moving horizontally to push or retain, by sliding, the horizontal bar vertically.

5. The device as claimed in claim 1, wherein the bending assembly includes a first support and a second support, a shape of the first support being different than a shape of the second support, and the position of the at least one of the supports is configured to change by substituting the first support with the second support to support the at least one glass sheet upon receiving the movement transmitted by the transmission member.

6. The device as claimed in claim 5, wherein the shape of the second support is variable during bending and variation in the shape of the second support is configured to occur after the substituting of the first support with the second support to support the at least one glass sheet has taken place.

7. A device for gravity bending of at least one glass sheet, the device comprising:
   a bending assembly including a plurality of supports to support the at least one glass sheet during bending;
   a furnace; and
   a drive system that changes a position of at least one of the supports, the drive system including:
      a displacement-controlling device that controls the rate of change of the position of the at least one of the supports,
      a movement generator-regulating system that generates and regulates the speed of a movement, and
      a transmission member connected to the movement generator-regulating system to transmit the regulated movement to the displacement-controlling device,
   the bending assembly including a first support and a second support, a shape of the second support being variable during bending, and a variation in the shape of the second support being controlled by a second drive system including
      a second displacement-controlling device that controls a rate of the variation,
      a second movement generator-regulating system placed outside the furnace, and
      a second transmission member connected to the second movement generator-regulating system and passing through the floor of the furnace to transmit movement to the second support.

\* \* \* \* \*